Dec. 13, 1966　　　W. F. ALTENPOHL, JR　　　3,291,303
POULTRY SELECTOR CONVEYOR ASSEMBLY
Filed March 13, 1963　　　　　　　　　　4 Sheets-Sheet 1

William F. Altenpohl, Jr.
INVENTOR.

BY Clarence A. O'Brien
and Harvey B. Jacobson
Attorneys

Dec. 13, 1966   W. F. ALTENPOHL, JR   3,291,303
POULTRY SELECTOR CONVEYOR ASSEMBLY
Filed March 13, 1963   4 Sheets-Sheet 2
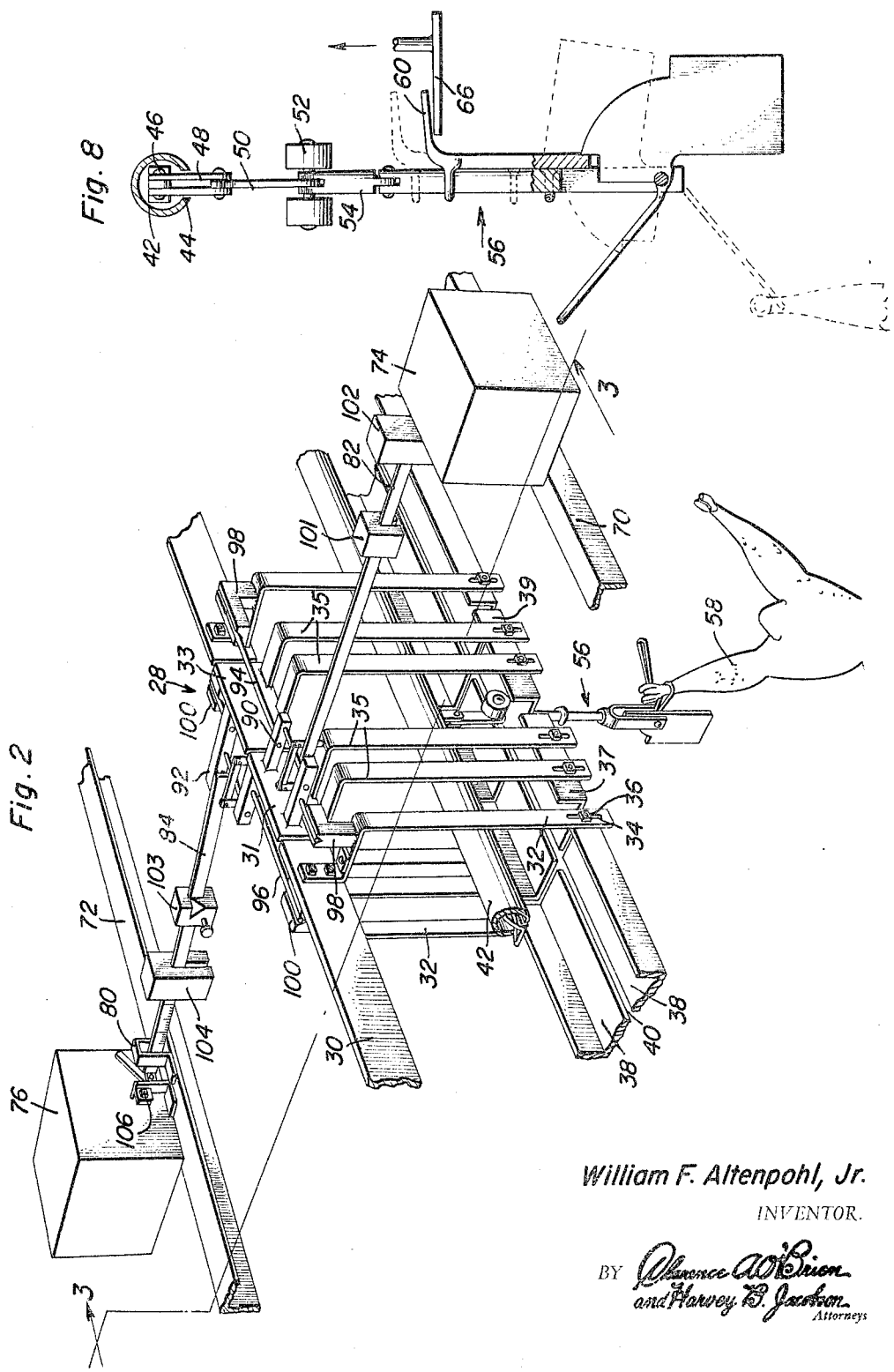
William F. Altenpohl, Jr.
INVENTOR.
BY Clarence A. O'Brien
and Harvey B. Jackson
Attorneys

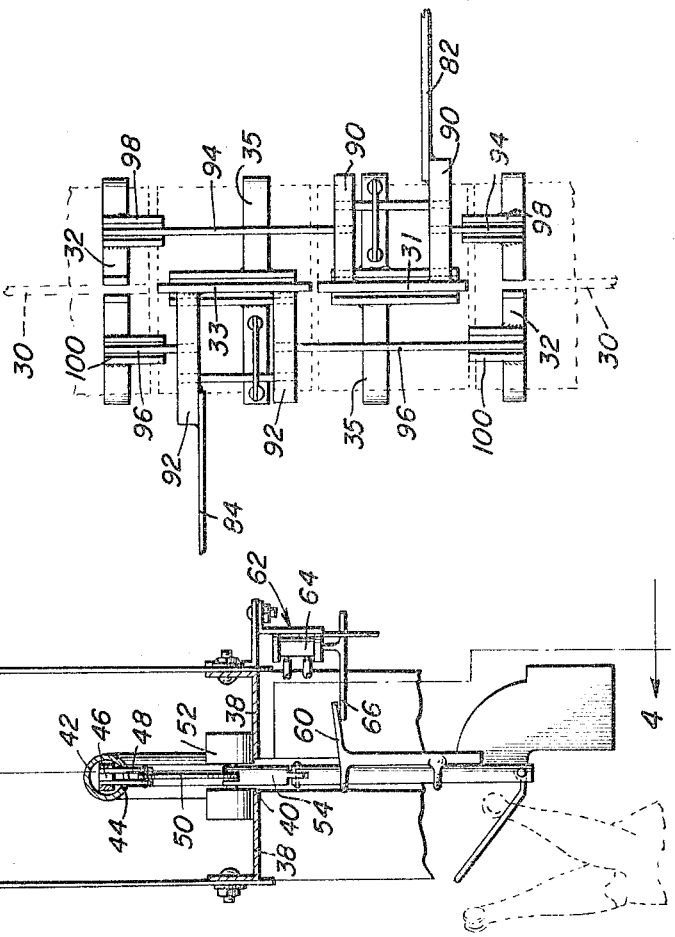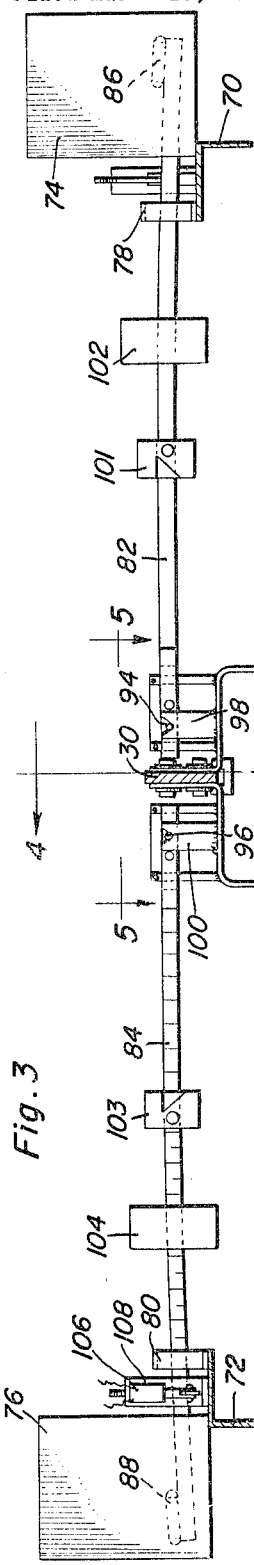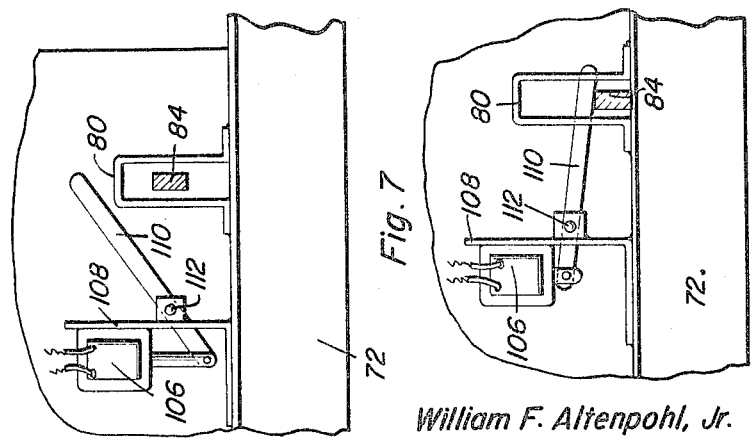

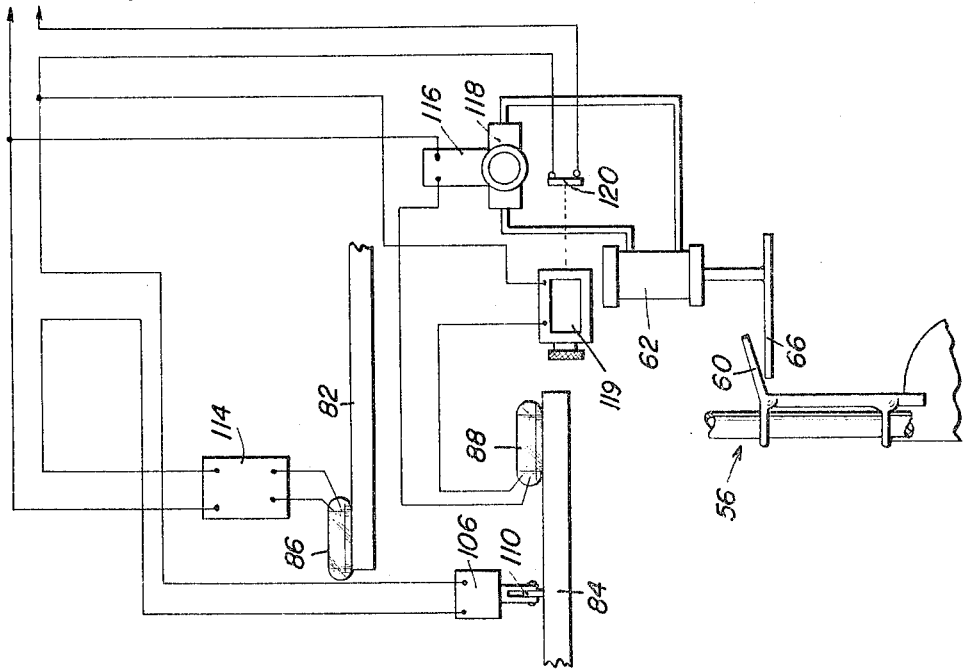
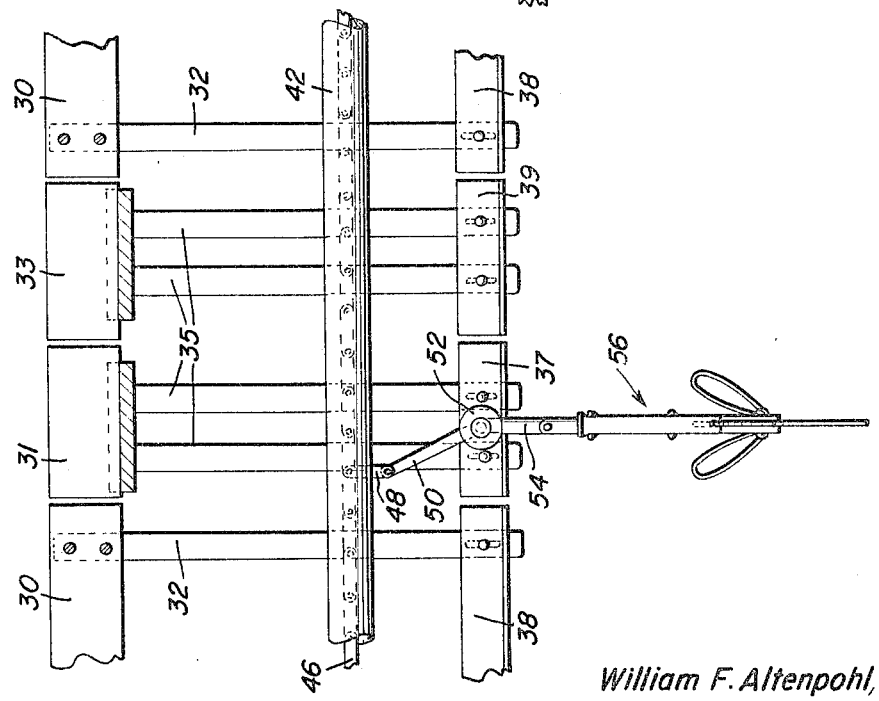
William F. Altenpohl, Jr.
INVENTOR.

United States Patent Office 3,291,303
Patented Dec. 13, 1966

3,291,303
POULTRY SELECTOR CONVEYOR ASSEMBLY
William F. Altenpohl, Jr., West Conshohocken, Pa., assignor to W. F. Altenpohl, Inc., a corporation of Pennsylvania
Filed Mar. 13, 1963, Ser. No. 264,967
13 Claims. (Cl. 209—121)

This invention comprises a novel and useful poultry selector conveyor assembly and more particularly pertains to a poultry conveyor assembly having means for automatically releasing from the conveyor either continuously or in any preselected quantity poultry having weights lying between a predetermined and adjustable maximum and minimum weight.

In the automatic handling of poultry by conveyor systems such as the well known overhead chain type of conveyor having individual hangers for poultry spaced at predetermined uniform intervals along the conveyor, it is customary to provide one or more poultry treating stations between a loading station at which poultry is attached to the conveyor and an ultimate discharge station at which all poultry is removed from the conveyor and is usually classified and separated in assorted weight groups.

One such treating station which is commonly employed is for the purpose of introducing into the dressed poultry carcass stuffing such as giblets, applying tags to the poultry and the like.

In the operation of such a conventional poultry treating and conveying assembly, when the need arises for filling special orders for poultry which require that the stuffing, tags or other particular treatment be omitted from the dressed poultry, it has become customary to introduce an additional handling operation after the poultry passes through the treatment station to then remove the stuffings or tags which were previously applied to the poultry at the last station. This results in extra handling of the poultry involving a double waste of effort, namely, that required to stuff and tag the poultry and then the subsequent treatment to reverse this last treatment operation.

It is therefore the primary purpose of this invention to provide a poultry conveying system including both apparatus and method which will effectively overcome this disadvantage and enable a conventional type of conveyor system to be successfully employed for selectively unloading poultry of a predetermined weight range from the conveyor in advance of the treatment station so as to avoid the duplicate steps of stuffing and then unstuffing the poultry carcass.

A further object of the invention is to provide a poultry conveyor assembly in accordance with the preceding object which will enable the weight range of the poultry to be removed from the conveyor prior to the treatment stations to be readily varied as may be desired.

A further object of the invention is to provide a method and an apparatus in accordance with the foregoing objects which enables an accurate count to be made of the poultry which are selectively discharged from the conveyor prior to reaching the special treatment station and to further automatically discontinue the operation and the method step of removing the poultry of the adjusted predetermined weight range from the conveyor system after a predetermined selected quantity of poultry has been so discharged from the conveyor system.

Yet another and more specific object of the invention is to provide an apparatus including an overhead track and conveyor system along which poultry carrying hangers are adapted to continuously pass and which shall include a pair of vertically movable track sections which are automatically depressed vertically in response to passage of poultry exceeding a predetermined weight passing thereacross together with mechanism operable by said depression of said track sections for energizing a poultry release mechanism by means of which the poultry depressing said sections are released from their supporting hangers.

Still another object of the invention in accordance with the immediately preceding object is to provide an interlock between the pair of movable sections whereby depression of a first section will prevent depressing of the second section for a predetermined time interval.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a perspective view of a portion of the apparatus at the selector discharge station for effecting the automatic discharge of poultry between adjustably varied maximum and minimum weights;

FIGURE 3 is a view in vertical transverse section taken substantially upon the plane indicated by the section line 3—3 of FIGURE 2;

FIGURE 4 is a detail view in vertical longitudinal section taken substantially upon the plane indicated by the section line 4—4 of FIGURE 3;

FIGURE 5 is a further detail view in vertical horizontal section taken substantially upon the plane indicated by the section line 5—5 of FIGURE 3;

FIGURES 6 and 7 are detail views showing alternate positions of certain parts of an operation blocking means shown in FIGURES 2 and 3;

FIGURE 8 is a further detail view in vertical transverse section of the poultry discharge mechanism for releasing poultry at the selector discharge station, being a somewhat enlarged view of a portion of FIGURE 3; and FIGURE 9 is a wiring diagram of the electrical circuit employed in connection with this invention.

Figure 1:
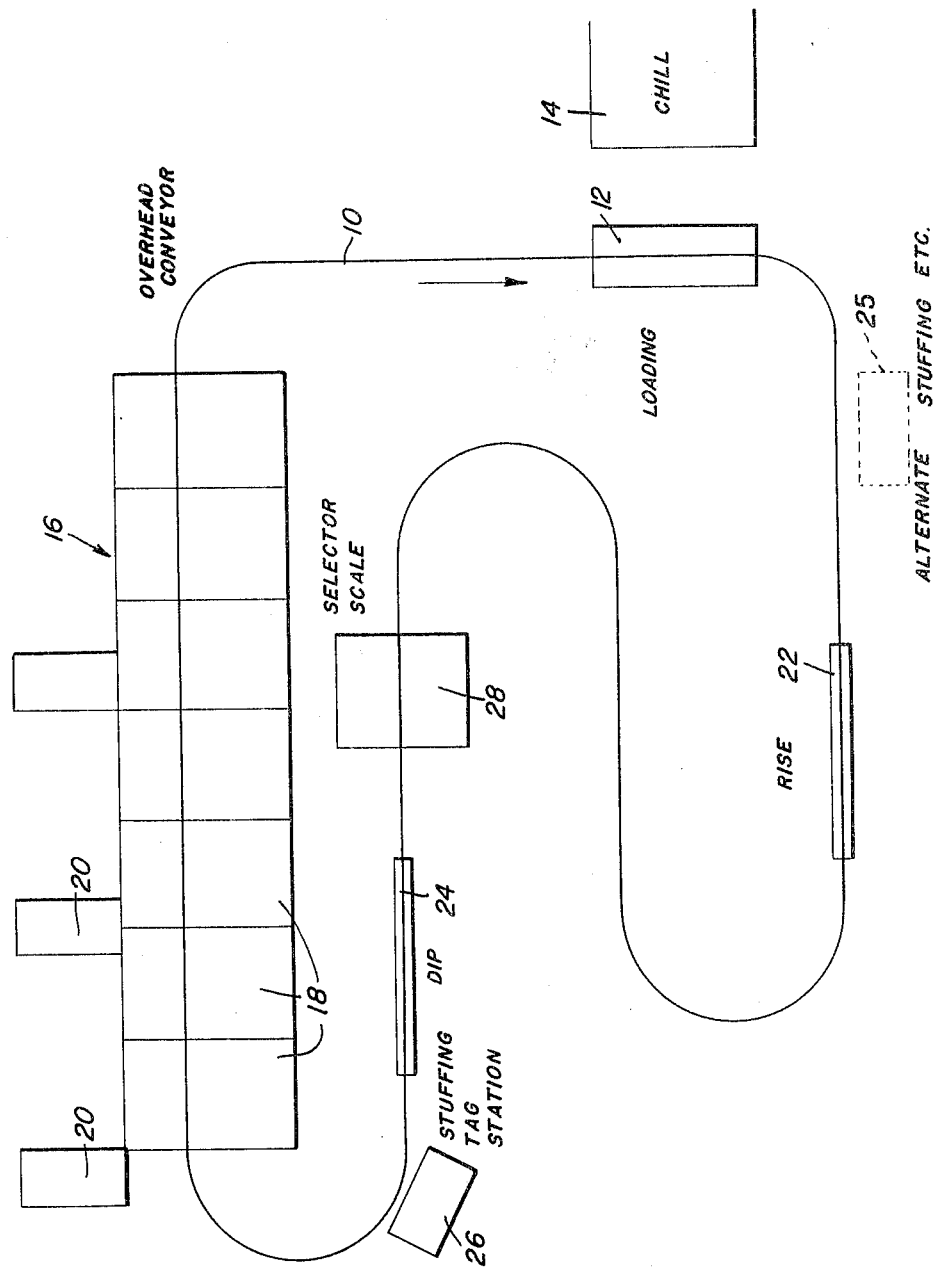
FIGURE 1 is a diagrammatic view indicating the general arrangement of a poultry conveyor system incorporating therein the selector discharge station in accordance with this invention.

Reference is made first to the diagrammatic view of FIGURE 1 which schematically indicates the general arrangement of the apparatus of the conveyor assembly of a conventional type to which the principles of this invention have been applied, the operation of such an assembly and the method performed by this invention. Indicated generally by the numeral 10 is a line representing both the path of travel of the poultry conveyor and the conveying means itself. The actual conveyor although preferably of the overhead type may in accordance with this invention be of any known and conventional type, it being merely essential for the purposes of this invention that the conveyor shall include a plurality of uniformly spaced hangers each of which carries the dressed poultry carcass which is to be transported by the conveyor from a loading station 12, where the poultry may be received as from a chilling device or cooler 14, to a delivery station indicated generally by the numeral 16 and which will usually comprise a plurality of bins or hoppers 18 each of which is adapted to receive a selected weight range of poultry, conventional weight sorting, separating and discharge mechanism provided as represented diagrammatically at 20 for removing the poultry from the hangers in response to determination of predetermined weight ranges of the poultry and discharging this poultry into the appropriate bins or hoppers 18. Inasmuch as the actual automatic weight sorting, separating and discharging means provided at the delivery station 16 may be of any conventional character and does not in itself form any part of the invention set forth and claimed hereinafter, a further description of the same is deemed to be unnecessary.

Although the conveyor 10 may be disposed upon substantially the same horizontal level or elevation, it is also within the purview of this invention to have various portions of this path of travel and of the conveyor disposed at different horizontal levels as suggested by the conveyor track rises and dips diagrammatically indicated at 22 and 24, respectively.

In the conventional conveyor assembly before the advent of this invention, it was customary to provide various poultry treating stations such as that illustrated in dotted lines at 25 which were provided for the purpose of introducing into the dressed chilled poultry carcasses, stuffing, applying tags thereto and the like. However, with the use of such a conventional system including the treatment station 25, a considerable disadvantage arose when it was desired to supply a special order of poultry in which the treating operation of the station 25 was not desired. Heretofore it was necessary at some subsequent station and before the poultry arrived at the delivery station 16 to remove the stuffing or otherwise effect the removal of the treatment accorded the poultry at the station 25 in order to obtain the desired condition of the poultry for the special order. This involved a needless expense and delay arising from the double handling of the poultry, first to apply the treatment at the station 25 and then to remove this treatment at a subsequent station.

Moreover, in obtaining such a special order it was frequently necessary to apply a selector of particular weight of poultry to the conveyor system in order to obtain a resultant order within a predetermined weight range. In such conventional practice, it was usually impossible to simultaneously process mixed poultry including fowls of other than the particular weight and treatment required for the special order. All of this required special handling and materially increased the cost of operation of the conveying and treating assembly.

In accordance with this invention two changes are made in the conveyor assembly and in the method of treating poultry in accordance with this invention. These consist in removing the previous conventional treatment station 25 and replacing it with a corresponding treatment station 26 so positioned that it would be rearwardly of a selector discharge poultry station 28.

The selector discharge station 28 constitutes a station at which poultry of a predetermined weight range, the maximum and minimum limits of which are selectively adjustable, is interposed to effect the discharge from the conveyor system at that station of any poultry lying within the selected weight limits. Consequently, when a special order was received for poultry which would omit the special treatment of the station 26, that poultry would be immediately and automatically discharged from the conveyor assembly without in any way interfering with the normal loading and operation of the conveyor and the assembly, prior to the poultry reaching the treating station 26 so that the desired treatment could be readily omitted from the selected poultry. This results in a great saving in labor costs as well as in handling of the poultry.

Further, the selector station in accordance with this invention is provided with an automatic counter of any desired character so that the number and/or total weight of the poultry discharged by this station can be readily ascertained and further in order that when a predetermined weight or number of poultry has been so discharged, in accordance with a predetermined order for a lot of poultry omitting the special treatment of the station 26, the selector discharge mechanism can then be manually or automatically rendered inoperative whereby all of the remaining poultry passing through the selector discharge station will continue to the delivery station 16 and will receive all of the normal treatment for which the conveyor assembly is adapted and devised.

In its broadest scope, this invention is not limited to any particular mechanism or means by which predetermined quantity and the predetermined weight limits of poultry are to be thus removed at the selector station. In its broadest sense, it is the provision of a method and an apparatus to perform this operation which forms the present invention.

However, in the drawings of FIGURES 2–8, there is disclosed a particular form of apparatus and mechanism provided at this station which has been found to be quite satisfactory for achieving the objects of this invention.

Referring now more particularly to FIGURES 2–4, it will be more readily seen that the conveyor assembly includes an overhead conveyor track installation by which the poultry hangers are supported and transported along the path of movement 10. The track assembly includes an overhead supporting framework such as a rail 30 which by means of oppositely disposed support brackets 32, which are slotted at 34 and provided with adjusting fasteners 36, serve to adjustably support a pair of L-shaped conveyor tracks each indicated by the numeral 38 and which are spaced from each other sufficiently to provide a longitudinally extending medially disposed slot 40 therebetween. Also suitably supported from the members 30 or 32 in a manner not shown is a longitudinally extending generally tubular conveyor chain housing 42 disposed medially above the track 38 and the slot 40 therebetween and which housing 42 has a longitudinally extending slot or opening 44, see FIGURES 3 and 8, upon its underside. Movably received within the housing 42 is an endless member such as a conveyor chain or the like 46 of any desired character and which is provided at uniformly spaced intervals as, for example, six inches along the length thereof with depending lugs or brackets 48 which extend downwardly through the slot 44. Supporting links 50 are connected to these depending lugs 48 and in turn are pivotally connected to a support roller assembly 52 which rides upon the rails or tracks 38. The roller assembly has a depending rod 54, extending through the slot 40 and which is pivoted to the upper end of a hanger or shackle indicated generally by the numeral 56 and by means of which a poultry carcass 58 is releasably supported.

The hanger or shackle 56 may be of any known conventional type and in itself forms no part of the invention claimed herein and may expeditiously and conveniently be of any of the constructions of the shackles disclosed in my prior patents, No. 3,132,373 issued May 12, 1964; Nos. 3,124,831 and 3,124,833, issued March 17, 1964.

However, as will be better apparent from a consideration of FIGURE 8, the hanger or shackle 56 is provided with a release trigger or lever 60 which is adapted to move into the operating range of and to be actuated by the automatic release mechanism indicated generally by the numeral 62 in FIGURE 3. This release mechanism includes an operating means 64 such as a fluid pressure operated cylinder and piston unit having an actuating rod or finger 66 thereon which is adapted to engage and lift the trigger 60 for thereby releasing the poultry carcass 58 from the hanger or shackle. The operating means 62 is in turn actuated in properly timed relation and in response to the selector discharge mechanism forming an important feature of this invention and to be subsequently described. Inasmuch as the details of the operator 62 and of the trigger mechanism 60 of the shackle 56 are not essential to the invention claimed herein and have been adequately disclosed and set forth as in my prior Patent Nos. 3,124,831 and 3,124,833, issued March 17, 1964, a further description of the same is deemed to be unnecessary.

At the selector discharge station 28 the previously described support rail 30 and the support tracks 38 which are stationarily mounted are broken and interposed therebetween are a pair of relatively movable but similarly constructed selector sections. The selector sections are identical and they consist of the support rail sections 31 and 33 each having support brackets 35 thereon and which carry the track sections 37 and 39. The members 31, 33, 35, 37 and 39 are identical with the members 30, 32 and 38 previously described except that they are disposed in alignment but at a slight distance from each other so as to permit relative vertical movement therebetween.

One of the sections such as that including the members 31, 35, and 37 constitutes a maximum weight selector scale assembly which is adjustable as set forth hereinafter to be depressed only when poultry exceeding a predetermined weight limit for which the device has been adjusted passes thereover. Poultry of less than this maximum weight will not depress this section and thus will not actuate the associated mechanism connected therewith.

The other section consisting of the elements 33, 35, and 39 is adapted to be depressed in response to the weight of poultry which is above the minimum predetermined weight for which this unit of the device is set. There is an interconnection between the mechanisms of the two sections such that when the first section is depressed by passage thereover of poultry exceeding the predetermined weight range, operation of the second section is prevented for an adjustable predetermined time interval so that poultry exceeding the maximum of the weight range desired will pass across both sections without depressing the latter and thus will continue along the path of travel 10 to the treating station 26 and from thence to the delivery station 16. However, when poultry which is less than the maximum weight passes over the first section, this interlock and time delay mechanism will not be energized and therefore when the poultry then passes over the second section, and the poultry is in a weight exceeding the minimum weight to which the section is sensitive, the latter will be depressed and through the associated mechanism the release mechanism will be energized to effect discharge of the poultry by actuation of the member 62 and the trigger 60. Thus, as long as this selector mechanism is in operation, any poultry carcass lying between the selected predetermined maximum and minimum weight limits will be automatically discharged from the conveyor assembly at the selector discharge station.

As previously mentioned, there is provided a counter mechanism which will operate each time the mechanism discharges a poultry carcass and will record the number of such ejections or the total weight or quantity of the poultry thus ejected in order that the attendant may be informed when the desired quantity of poultry has been so ejected. Further, control means is provided connected to and responsive to the counting mechanism so that after a predetermined quantity of poultry has been so ejected, this amount being adjustable in advance by the attendant, the movable sections are locked against adjustment or depression thus rendering the selector discharge mechanism inoperative so that the conveyor assembly may function in its normal operation.

Attention is now directed particularly to FIGURES 2–5 for an explanation of the weight operated selector mechanism. On opposite sides of the support rail 30, adjacent the movable rail and track sections are a pair of stationary support members 70 and 72 upon which are mounted certain weight actuated mechanism within enclosing housings 74 and 76. A pair of stop brackets 78 and 80 are mounted upon the members 70, 72 and limit the vertical oscillation of the scale beams or levers 82 and 84 which pass therethrough. The outer ends of these levers are movably received through slotted openings in the housings 74 and 76. The lever outer ends carry mercury switches 86 and 88 secured thereto. The inner ends of the levers are each secured to one of the movable rail and track sections.

Fixedly secured to and projecting laterally from the movable support rail sections 31 and 33 are pairs of arms 90 and 92 respectively. Fulcrum rods 94 and 96 project opposite from the arms 90 and 92 respectively in parallel relation to the support rail elements and are journaled in fulcrum bearing blocks 98 and 100 carried by the support brackets 32. In this manner, the movable rails 31, 33, their support brackets 35, the associated movable tracks 37, 39 and the attached levers 82 and 84 are supported upon the support brackets 32 of the fixed rails 30 for a vertical oscillation or rocking movement about the axes of the pivot rods 94 and 96.

Suitable spring means, not shown, may be provided if desired within the housings 74 and 76 to yieldingly urge the ends of the levers 82 and 84 downwardly while adjustable counterweights 102 and 104, slidable upon the levers 82 and 84 determine the weight of poultry which will cause a depression of the associated movable sections. In this manner the range of the weight actuation of the sections can be adjusted.

An interlock between the two movable sections is provided. This consists of a scale disabling solenoid 106 mounted on a bracket 108 upon the support member 72 and which operates a lock bar 110 pivoted at 112 to the solenoid bracket 108. The lock bar is adapted to pivot from the lifted, inoperative position of FIGURE 6 to the lowered, locking position of FIGURE 7 when the locking solenoid 106 is energized, thereby engaging and blocks the lever 84 against pivoting movement whereby depression of the second movable section is prevented.

As will be understood from FIGURE 9, the lever switch 86 controls the circuit of the lock solenoid. However, this circuit has a time controlled or time delay switch 114 which is adjustable to break the solenoid circuit after a small time interval. Since the time delay switch 114 may be of any conventional design well known to those skilled in the art and since its construction forms no part of the invention claimed herein, a more detailed disclosure thereof is deemed to be unnecessary.

The purpose and operation of the time delay switch and the interlock is as follows. When a fowl exceeding the maximum weight to be ejected from the conveyor line passes over the first movable section, the latter will be depressed and the rocking of the beam 82 will energize the solenoid circuit through the mercury switch 86 and the time delay switch 114. Energization of the solenoid circuit will instantaneously move the lock bar 110 to the position of FIGURE 7 thereby preventing depressing of the second movable section. This blocking action continues for the time interval for which the time delay switch 114 is set. This interval is long enough to allow the poultry hanger to pass over both movable sections, but is short enough to cause the lock solenoid to be again deenergized before the succeeding poultry hanger reaches the first movable section.

When the lever of the second movable section is not blocked by the lock bar 110 as previously described, it will be depressed when a fowl exceeding the adjustable minimum weight limit passes upon the second section movable tracks. This will operate the lever switch 88 and through the electric circuits connected therewith will energize the contact valve solenoid 116 which controls valve 118, the actuating fluid to the release mechanism operating means 62.

It will also operate a counter 119 which is of any conventional, commercially available type, and indicates the quantity of fowls ejected from the conveyor line. The counter 119 is also adjustable so that after a predetermined number of operations of the ejecting mechanism, it will through a cut-off switch 120 render the entire ejecting mechanism inoperative by cutting of its electrical current supply.

The operation of the selector mechanism is as follows: With the conveyor carrying fowl of mixed weights, including those which it is desired to eject, the counterweights 101, 102 of the first movable section are adjusted to the maximum weight of the fowls to be released from the conveyor. The counterweights 103, 104 of the second movable section are likewise adjusted to the minimum weight of the fowls to be released. The main switch controlling the flow of electric current to the selector mechanism is closed.

The conveyor line is started and fowl of mixed weights now pass successively through the selector station. All fowls of less than the minimum weight for which the lever 84 of the second movable section has been set will pass through both the first and second movable sections without depressing either lever 82 or 84. These fowl will thus be eventually treated at the station 26 and eventually discharged at the delivery station 16.

When fowl exceeding the maximum weight for which the first section lever 82 has been set rest upon the first section tracks 37 they will depress the first section, rock the lever 82 and actuate the interlock solenoid thereby preventing depressing of the second movable section. This interlock continues for a sufficient time, due to the action of the adjustable time delay switch 114 to allow the overweight fowls to pass both sections, be treated at the station 26 and finally discharged at the station 16. Thus fowls exceeding the maximum weight limit desired are uninterrupted during the travel through the conveyor system.

However when fowls of less than the desired maximum weight rest upon the first movable section, they do not depress this section or the lever 82 and hence the interlock is not energized. Therefore the second movable section is free to operate. All fowls which now enter the second movable track section and which exceed the minimum weight for which the lever 4 is adjusted will depress this section, rock the lever 84 and through the mercury switch 88 will actuate the release mechanism which will eject or discharge this fowl from the conveyor system. At the same time the counter 118 will be actuated. When the desired total of fowls has been ejected, for which the counter has been set, the latter will operate the shut-off switch 120. This will deenergize the circuits of the automatic selection device and allow all poultry, regardless of weight to pass through the entire conveyor line.

It will be noted from FIGURE 4 that the weight of the hanger and fowl are supported entirely by the movable track sections 37 and 39 and not by the conveyor chain 46 during passage through the movable weight responsive section.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A selector conveyor assembly comprising conveying means for carrying articles from a source of supply to a delivery station, a selector discharge station in said conveyor assembly between said source of supply and said delivery station, means for discharging from said conveying means at said selector station articles within a predetermined weight range, said discharging means including scale means to which the weight of each article is sequentially applied and article release means rendered inoperative in response to sensing of articles outside of said weight range, said conveying means including a pair of stationary support rails each carrying a stationary conveyor track, said scale means compising a movable support rail carrying a movable conveyor track, said movable support rail and track being disposed between and in alinement with said stationary support rails and tracks respectively, a scale beam having one end secured to and supporting said movable support rail, a fulcrum pin on said scale beam supported and journaled upon at least one of said stationary support rails and mounting said scale beam for vertical movement of said movable support rail and track, adjustable counterbalance means normally retaining said movable track in a raised and inoperative position and yieldable to a predetermined article weight placed thereon for lowering the latter to its operative position, means connecting said scale beam to said release means and operative to actuate the latter when said scale beam is in its operative position.

2. The combination of claim 1 including a stop movable into position to engage said scale beam and prevent movement of the latter into its operative position, a solenoid connected to and controlling movement of said stop.

3. The combination of claim 2 including an automatic counter disposed at said selector discharge station and connected to said discharging means and recording the articles removed from said conveyor at said selector discharge station, control means connected to said counter and to said discharging means and effective to render the latter inoperative after the discharge of a predetermined quantity of articles has been recorded by said counter, means including an electric circuit connecting said control means to said solenoid and energizing the latter.

4. In combination with a conveyor system for conveying articles in spaced relation at a predetermined speed to a delivery station, means for removing articles between preset maximum and minimum weight limits from said conveyor system prior to arrival at said delivery station comprising, at least two closely spaced weight sensing stations in the conveyor system through which the articles sequentially pass, means responsive to the sensing of articles exceeding one of said preset weight limits for discharging such articles only at one of said weight sensing stations, and disabling means responsive to sensing of articles exceeding the other of said preset limits at the other of said weight sensing stations for preventing discharge of such latter articles at said one of the weight sensing stations.

5. The combination of claim 4 including time delay means operatively connected to the disabling means for maintaining the same operative until after each article exceeding said other of the weight limits has passed said one of the weight sensing stations but before another article has arrived at the other of the weight sensing stations.

6. In combination with an article conveyor system for conveying articles from a loading station to a delivery station, a pair of movable conveyor sections between said loading station and the delivery station, weight sensing means responsive to movement of articles exceeding different weight limits along the respective conveyor sections for respectively displacing said conveyor sections, disabling means responsive to said displacement of one of the conveyor sections for preventing subsequent displacement of the other of said conveyor sections, and means responsive only to displacement of said other of said conveyor sections for discharging articles from the conveyor system, whereby only articles outside the weight range defined between said weight limits are conveyed past both weight sensing means to the delivery station.

7. The combination of claim 6 including means connected to the disabling means for restoring the other of the conveyor sections to an operative condition immediately after departure of an article therefrom.

8. A method of handling articles comprising the steps of: continuously conveying said articles along a fixed path of travel in spaced relation to each other from a loading station to a delivery station; ejecting an article from the path of travel at a single ejection station disposed between the loading station and the delivery station if the weight of the article is above a preset minimum weight and below a preset maximum weight; sequentially sensing the weight of the articles at two spaced locations along the conveying path with the ejection station being located at one of the sensing locations and the ejection action being carried out at the one of said sensing locations, said ejection action not being effected if the sensed weight of an article is less than the preset minimum; preventing removal of articles and carrying out of the ejection action at the ejection station at the one of the sensing locations if the sensed weight of an article at the other of the sensing locations exceeds the preset maximum weight, said sensing of articles of a weight below the preset maximum and above the preset minimum weight limits actuating the ejection action so that articles within such weight range are ejected at the ejection station and conveying only articles outside of the weight range defined by said preset maximum and preset minimum weight limits to the delivery station.

9. A selector conveyor assembly comprising conveying means for conveying articles below a preset minimum weight and above a preset maximum weight uninterruptedly from a supply station to a delivery station, means for ejecting an article from the conveying means at a single ejection station disposed between the loading station and the delivery station if the weight of the article is below a preset maximum weight and above a preset minimum weight, sensing means for sensing the weight of the articles at two spaced locations along the conveying means, said ejection means being operatively disposed at one of said weight sensing locations, said ejection means being non-operative if the sensed weight of an article sensed at the sensing locations is below the preset minimum weight, means preventing operation of the ejection means at the ejection station at the one of the weight sensing locations if the sensed weight of an article at the other of the sensing locations exceeds the preset maximum weight, and means rendering the ejection means operable in response to the weight sensing means if the weight of a sensed article is above the preset minimum weight and below the preset maximum weight limits with said conveying means carrying articles of a weight above the preset maximum and below the preset minimum weights uninterruptedly past the ejection station onto the delivery station.

10. The combination of claim 9 including an automatic counter disposed at said ejection station and connected to said ejecting means and recording the articles ejected from said conveying means at said ejection station.

11. The combination of claim 10 including control means connected to said counter and to said ejecting means and effective to render the latter inoperative after the ejection of a predetermined quantity of articles has been recorded by said counter.

12. The combination of claim 9 wherein said sensing means includes scale means comprising a weight responsive vertically movable element disposed in a position for sequentially receiving the weight of the articles carried by said conveying means, a scale beam pivotally mounted and having one end secured to and supporting said element for vertical movement from a normal raised and inoperative position to a lowered operative position when an article exceeding a minimum weight is imposed thereon, operating means connected to said scale beam and to said ejection means and operable upon movement of said scale beam to its operative position to cause operation of said ejection means.

13. The combination of claim 12 including blocking means operable to prevent movement of said scale beam to its operative position, and actuating means connected to said blocking means and responsive to articles exceeding the maximum weight causing the blocking means to block movement of said scale beam to its operative position.

References Cited by the Examiner
UNITED STATES PATENTS

| | | | |
|---|---|---|---|
| 1,814,026 | 7/1931 | Draeger | 209—121 |
| 1,942,267 | 1/1934 | Warren | 209—121 |
| 2,471,711 | 5/1949 | Altenpohl | 209—121 |
| 2,876,901 | 3/1959 | Roth | 209—121 |
| 3,081,861 | 3/1963 | Plach | 198—40 |
| 3,244,278 | 4/1966 | Weprin | 209—121 |

FRANK W. LUTTER, *Primary Examiner.*